United States Patent
Hisamatsu

(10) Patent No.: US 8,161,308 B2
(45) Date of Patent: Apr. 17, 2012

(54) POWER SUPPLY CONTROL METHOD AND CIRCUIT IN COMMUNICATION EQUIPMENT

(75) Inventor: Hidenori Hisamatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 431 days.

(21) Appl. No.: 12/412,684

(22) Filed: Mar. 27, 2009

(65) Prior Publication Data

US 2009/0271647 A1    Oct. 29, 2009

(30) Foreign Application Priority Data

Apr. 23, 2008  (JP) ................ 2008-111937

(51) Int. Cl.
  G06F 1/00     (2006.01)
  G06F 1/32     (2006.01)
  G06F 7/38     (2006.01)
  G06F 7/32     (2006.01)
  G06F 7/52     (2006.01)
  G06F 15/00    (2006.01)
  H04L 12/28    (2006.01)
  H04M 1/00     (2006.01)

(52) U.S. Cl. ..... 713/323; 713/320; 713/324; 370/395.1; 455/574; 708/233; 708/521; 708/631; 712/32

(58) Field of Classification Search .......... 713/320, 713/323, 324; 370/395.1; 455/574; 708/233, 708/521, 631; 712/32
See application file for complete search history.

(56) References Cited

U.S. PATENT DOCUMENTS

| | | | |
|---|---|---|---|
| 5,637,932 A | 6/1997 | Koreeda et al. | |
| 7,558,972 B2 * | 7/2009 | Hoshino et al. | 713/300 |
| 7,606,151 B2 * | 10/2009 | Chilukoor | 370/230 |
| 2003/0005340 A1 * | 1/2003 | Ku | 713/300 |
| 2004/0160898 A1 | 8/2004 | Lim et al. | |
| 2005/0262368 A1 | 11/2005 | Cherukuri et al. | |
| 2009/0213800 A1 * | 8/2009 | Lee et al. | 370/329 |

FOREIGN PATENT DOCUMENTS

| | | |
|---|---|---|
| JP | 2002182807 A | 6/2002 |
| JP | 2003271267 A | 9/2003 |
| JP | 2004236350 A | 8/2004 |

* cited by examiner

*Primary Examiner* — Stefan Stoynov

(57) ABSTRACT

A circuit includes: an input buffer for storing input data; a plurality of processing sections connected in series including a head processing section and a tail-end processing section to sequentially process the input data; and a power supply controller for controlling power supply to each of the plurality of processing sections depending on a lapse of time during which no input data is stored in the input buffer.

24 Claims, 5 Drawing Sheets

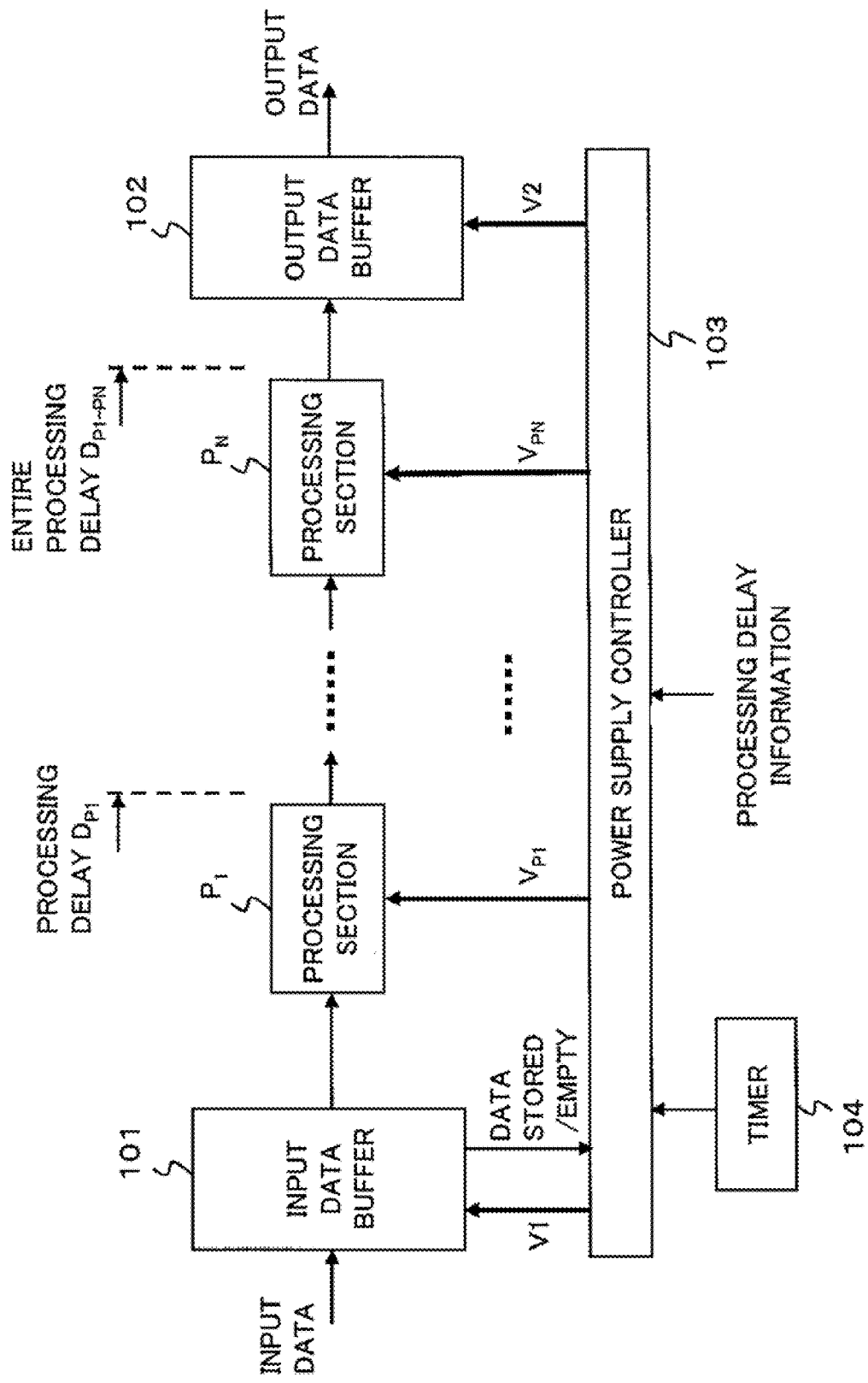

POWER SUPPLY CONTROL METHOD AND CIRCUIT IN COMMUNICATION EQUIPMENT

This application is based upon and claims the benefit of priority from Japanese Patent Application No. 2008-111937, filed on Apr. 23, 2008, the disclosure of which is incorporated herein in its entirety by reference.

BACKGROUND OF THE INVENTION

1. Field of the Invention

The present invention relates to communication equipment and, more particularly, to power supply control method and circuit for reduction of power consumption in the communication equipment such as packet-based communication equipment and the like.

2. Description of the Related Art

To preserve the global environment, while energy conservation measures have been considered and studied at the global level, legislation for energy conservation and carbon dioxide emissions reduction has also begun to be discussed in individual nations. Although what is generally thought of as the subject of such study and discussion is the energy consumption involved in transportation, distribution, and manufacture in many cases, attention is beginning to be also paid to the increasing energy consumption related to information communication equipment and network infrastructure as well as electronic equipment such as computers and servers.

Electronic equipment, such as computers and servers, spends relatively large amounts of time in a state of not performing operational processing (in general, referred to as "idle state"). Therefore, the average power consumption can be reduced by suppressing the power consumed in the idle state. That is, electronic equipment can highly effectively contribute to a reduction in equivalent carbon dioxide emissions.

On the other hand, information communication equipment is required to always keep a state capable of communicating data, although a transition is being made from analog communications to digital communications. Therefore, there is a premise that information communication equipment cannot tolerate the idle state, unlike electronic equipment such as computers and servers. That is, information communication equipment has no other way of reducing the average power consumption but by lowering the value of normal operating power.

Accordingly, mainstream techniques for reducing power consumption in information communication equipment are mostly those from a device-technology perspective, such as higher levels of large-scale integration of electronic parts, and lower operating voltage owing to finer electronic parts.

However, in reality, as to the effect of the lower operating voltage owing to a finer electronic part, the operating voltage has already fallen below one volt, and the pace of operating voltage reduction is slowing down. Moreover, the effect of the larger-scale integration is also on a downward trend. Therefore, it is more and more difficult to achieve a significant reduction of power consumption in information communication equipment.

Further, as an electronic part become finer to fall below 90 nm in size, leakage current is increased to have a non-negligible value. Accordingly, despite individual device venders' efforts at the device technology-based studies, the power consumption in the idle state is significantly increasing.

On the other hand, measures from the viewpoint of circuit design are also studied. Attempts have been made step by step to achieve lower power consumption by employing asynchronous circuitry and schemes, which use no clock, in place of clock synchronous circuitry and schemes, which are the mainstream of the internal circuitry of an electronic part.

To a device for performing power control in the above-described communication equipment, it is possible to apply the techniques described in JP2002-182807 and JP2003-271267. According to the technique described in JP2002-182807, pieces of power control information and various operational conditions of a processor stored in a power table are rewritable. According to the technique described in JP2003-271267, the power consumed inside a processor is controlled depending on effective addresses. Particularly in a case of a processor that executes a program consisting of multiple parts, the power consumed inside the processor is controlled based on those program parts which are currently executed.

However, these techniques for reducing power consumption in information communication equipment aim at obtaining an effect of reducing the average power consumption by reducing the normal operating power and the power consumption in the idle state. Accordingly, there is a problem that ordinary developers have no opportunity to use the asynchronous circuitry and schemes, as development techniques, for general electronic parts such as, for example, application specific integrated circuits (ASICs) and field programmable gate arrays (FPGAs), since development tools for design and evaluation have not been improved yet.

As for packet-based communication, packet-based communication equipment receives a varying amount of traffic and performs sequential processing of received packets. However, it is known that packet-based communication is not performed at all times and therefore the packet-based communication equipment may be kept in the state capable of data communication without transmitting or receiving data for a considerably long time. Therefore, the intervals between input packets are long and the amount of input traffic is small, so that there is a period of time when no packet exists in packet processing sections. Even during such a period when packet processing operation is not required, power is supplied from the power supply section. Since power is supplied even when each packet processing section does not need to perform packet processing, power consumption called "standby power" is produced, which means power is constantly consumed by each packet processing section. Accordingly, the average operating power consumption is large and is not reduced even at the time of small traffic. It is apparent that the techniques described in JP2002-182807 and JP2003-271267 cannot solve such a problem.

For power consumption reduction in such communication equipment, JP2004-236350 discloses a radio communication device which can effectively reduce power consumption depending on a reduction in the amount of signal processing during periods of no user data. More specifically, the radio communication device disclosed in JP2004-236350 is provided with a baseband signal processing section for processing a frame-structured signal, which includes a plurality of signal processing engines and data buffers connected in series. A signal processing engine checks whether data to be processed in a following signal processing engine is left or not. Based on the result of the check, a control engine controls a power supply controller to reduce power consumption at the signal processing engines and data buffers.

However, according to JP2004-236350, the control engine uses the results of checks at respective signal processing engines to perform power consumption control. Accordingly, with an increasing number of signal processing engines, the amount of load on the control engine and each signal processing engine becomes larger.

SUMMARY OF THE INVENTION

Accordingly, an object of the present invention is to solve the above-described problem and to provide a power supply control method and circuit which can lower the power consumption of a circuit device without increasing in load on its control system.

According to the present invention, a circuit includes: an input buffer for storing input data; a plurality of processing sections connected in series including a head processing section and a tail-end processing section to sequentially process the input data; and a power supply controller for controlling power supply to each of the plurality of processing sections depending on a lapse of time during which no input data is stored in the input buffer.

According to the present invention, a method for controlling power supply to a plurality of processing sections connected in series including a head processing section and a tail-end processing section to sequentially process input data stored in an input buffer, includes: measuring a lapse of time during which no input data is stored in the input buffer; and controlling power supply to each of the plurality of processing sections depending on the lapse of time.

According to the present invention, it is possible to obtain advantages that the power consumption of a circuit device can be lowered without increasing in load on its control system.

BRIEF DESCRIPTION OF THE DRAWINGS

FIG. 1 is a block diagram showing a data processing circuit provided with a power supply controller according to an exemplary embodiment of the present invention.

DETAILED DESCRIPTION OF THE PREFERRED EMBODIMENTS

Figure 2A:
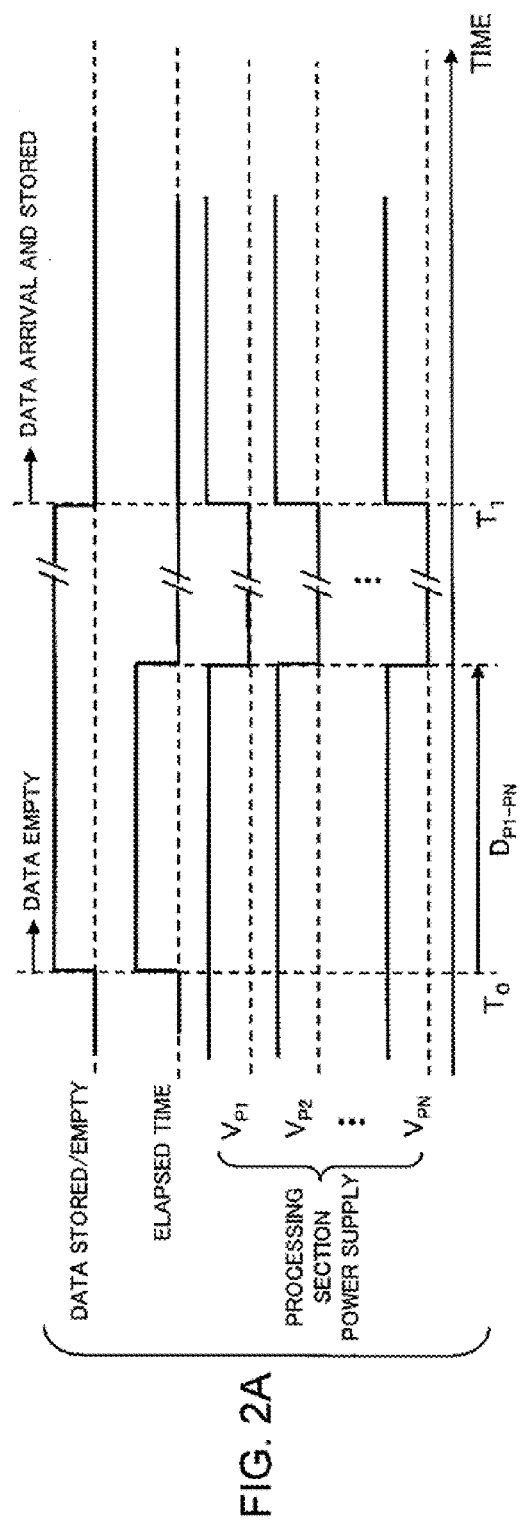
FIG. 2A is a time chart showing a first example of a power-supply control method according to the exemplary embodiment of the present invention.

1. Exemplary Embodiment
1.1) Circuit Structure

As shown in FIG. 1, a communication device includes a data processing circuit and a power supply controller which monitors the stored state of input data to control the power supply to the data processing circuit.

The data processing circuit includes an input data buffer 101, a plurality of processing sections $P_1$-$P_N$ (N is an integer greater than 1) and an output data buffer 102. Input data is stored in the input data buffer 101 and is sequentially processed by the processing sections $P_1$-$P_N$. Data that has been processed by the tail-end processing section $P_N$ is stored in the output data buffer 102 and then is output as output data to a following stage. It should be noted that each of the processing sections $P_1$-$P_N$ may perform any kind of data processing, for example, protocol processing, buffering for clock change or the like.

The power supply controller 103 according to an exemplary embodiment of the present invention outputs power supply voltage V1 to the input data buffer 101, power supply voltages $V_{P1}$-$V_{PN}$ to respective ones of the processing sections $P_1$-$P_N$, and power supply voltage V2 to the output data buffer 102. The power supply voltages V1 and V1 and the power supply voltages $V_{P1}$-$V_{PN}$ may be the same voltage or different voltages in groups generated from a reference voltage.

The power supply controller 103 controls power-ON/OFF timings of the power supply voltages $V_{P1}$-$V_{PN}$ (and, if possible, V2) based on a data stored/empty signal received from the input data buffer 101, elapsed time information received from a timer 104, and processing delay information. In the present embodiment, the processing delay information is previously set in the power supply controller 103, which indicates an entire processing delay $D_{P1\text{-}PN}$ or each of subtotal processing delays $D_{P1}$, $D_{P1\text{-}P2}$, ..., $D_{P1\text{-}PN}$, where $D_{P1}$ < $D_{P1\text{-}P2}$ < ... < $D_{P1\text{-}PN}$. It should be noted that the processing delay of each processing section may be fixed or vary depending on the amount of data to be processed and/or the kind of processing such as data analysis, data filtering and other various kinds of processing.

More specifically, the entire processing delay $D_{P1\text{-}PN}$ is a total delay of time between the time when the head processing sections $P_1$ starts processing of the input data and the time when the tail-end processing sections $P_N$ completes processing of data received from the previous processing section $P_{N-1}$. The subtotal processing delay $D_{P1}$ is a delay of time until the head processing sections $P_1$ completes processing of data received from the input data buffer 101. The subtotal processing delay $D_{P1\text{-}P2}$ is a subtotal delay of time from a time when the head processing sections $P_1$ starts processing of the input data to a time when the second processing sections $P_2$ completes processing of data received from the previous processing section $P_1$. Similarly, a subtotal processing delay $D_{P1\text{-}Pj}$ is a subtotal delay of time from a time when the head processing sections $P_1$ starts processing of the input data to a time when a corresponding processing sections $P_j$ completes processing of data received from the previous processing section $P_{j-1}$. Accordingly, the entire processing delay $D_{P1\text{-}PN}$ is equal to the subtotal processing delay $D_{P1\text{-}PN}$.

Hereinafter, examples of a power supply control operation performed by the power supply controller 103 will be described in details.

1.2) Concurrent Power-OFF Control

Referring to FIG. 2A, it is assumed that the entire processing delay $D_{P1\text{-}PN}$ is previously set in the power supply controller 103 and the power supply controller 103 is supplying the power supply voltages $V_{P1}$-$V_{PN}$ to the data processing circuit.

At a time $T_0$ when the power supply controller 103 detects the data empty state of the input data buffer 101 after the input data buffer 101 has output all input data to the data processing circuit without inputting data, the power supply controller 103 starts the timer 104 to measure an elapsed time and compares the elapsed time with the entire processing delay $D_{P1\text{-}PN}$. When the elapsed time reaches the entire processing delay $D_{P1\text{-}PN}$, the power supply controller 103 concurrently turns off the power supply voltages $V_{P1}$-$V_{PN}$ so as to reduce power consumption when no input data to be processed is stored in the input data buffer 101. Since the entire processing delay $D_{P1\text{-}PN}$ is the total delay of time in the data processing circuit, the processing sections $P_1$-$P_N$ can be concurrently powered off after the entire processing delay $D_{P1\text{-}PN}$ has elapsed.

Thereafter, at a time $T_1$ when the power supply controller 103 detects the data arrival in the input data buffer 101, the power supply controller 103 concurrently starts powering on the processing sections $P_1$-$P_N$ to perform data processing of each processing section.

As described above, according to the present example, the power supply controller 103 concurrently turns off the power supply voltages $V_{P1}$-$V_{PN}$, resulting in reduced power consumption without impairing its normal performance.

1.3) Sequentially Delaying Power-OFF Control

Figure 2B:
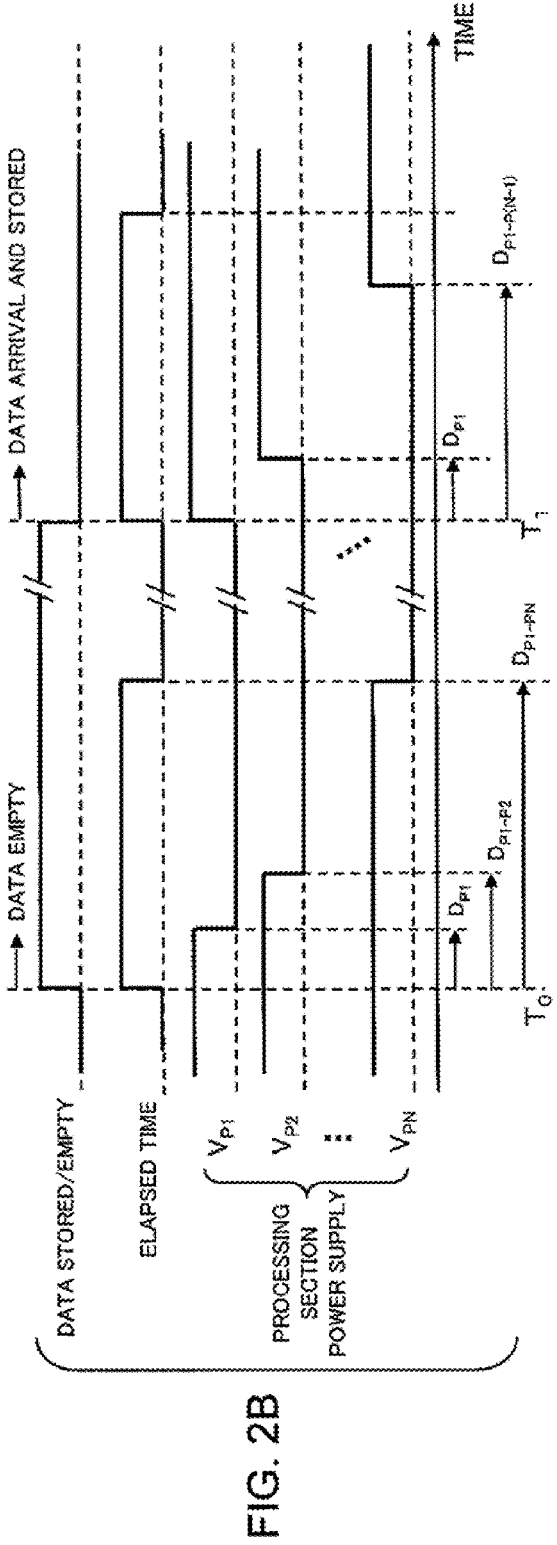
FIG. 2B is a time chart showing a second example of a power-supply control method according to the exemplary embodiment of the present invention.

Referring to FIG. 2B, it is assumed that the subtotal processing delays $D_{P1}$, $D_{P1\text{-}P2}$, ... and $D_{P1\text{-}PN}$ are previously set in the power supply controller 103 and the power supply controller 103 is supplying the power supply voltages $V_{P1}$-$V_{PN}$ to the data processing circuit.

At a time $T_0$ when the power supply controller 103 detects the data empty state of the input data buffer 101 after the input data buffer 101 has output all input data to the data processing circuit without inputting data, the power supply controller 103 starts the timer 104 to measure an elapsed time and sequentially compares the elapsed time with the subtotal processing delays $D_{P1}$, $D_{P1\text{-}P2}$, ... and $D_{P1\text{-}PN}$.

When the elapsed time reaches the first subtotal processing delay $D_{P1}$, the power supply controller 103 turns off the power supply voltage $V_{P1}$ while supplying power to the other processing sections $P_2$-$P_N$. Since the subtotal processing delay $D_{P1}$ is the delay of time until the head processing sections $P_1$ completes processing of data received from the input data buffer 101, the processing section $P_1$ can be powered off after the first subtotal processing delay $D_{P1}$ has elapsed. Similarly, when the elapsed time reaches the second subtotal processing delay $D_{P1\text{-}P2}$, the power supply controller 103 further turns off the power supply voltage $V_{P2}$ while supplying power to the other processing sections $P_3$-$P_N$. In this way, the power supply controller 103 sequentially turns off the power supply voltage $V_{Pj}$ each time the elapsed time reaches a corresponding subtotal processing delay $D_{P1\text{-}Pj}$, and finally turns off the power supply voltage $V_{PN}$ when the elapsed time reaches the final subtotal processing delay $D_{P1\text{-}PN}$. Since a subtotal processing delay $D_{P1\text{-}Pj}$ is a subtotal delay of time from a time when the head processing sections $P_1$ starts processing of the input data to a time when a corresponding processing sections $P_j$ completes processing of data received from the previous processing section $P_{j-1}$, the processing section $P_j$ can be powered off after the corresponding subtotal processing delay $D_{P1\text{-}Pj}$ has elapsed.

Thereafter, at a time $T_1$ when the power supply controller 103 detects the data arrival in the input data buffer 101, the power supply controller 103 concurrently starts powering on only the head processing section $P_1$ while the other processing sections $P_2$-$P_N$ powering off, to perform processing of the data stored in the input data buffer 101. After the first subtotal processing delay $D_{P1}$ has elapsed, the power supply controller 103 starts powering on the second processing section $P_2$ while the other processing sections $P_3$-$P_N$ powering off, to perform processing of the data output from the head processing section $P_1$. In this way, the power supply controller 103 sequentially turns on the power supply voltage $V_{Pj}$ each time the elapsed time reaches a corresponding subtotal processing delay $D_{P1\text{-}P(j-1)}$, and finally turns on the power supply voltage $V_{PN}$ when the elapsed time reaches the subtotal processing delay $D_{P1\text{-}P(N-1)}$.

As described above, according to the present example, the power supply controller 103 sequentially turns off and sequentially turns on the power supply voltages $V_{P1}$-$V_{PN}$ depending on processed data propagation, making a power-OFF time period longer without impairing its normal performance, resulting in further reduced power consumption.

1.4) Advantages

According to the present exemplary embodiment, it is possible to obtain advantages that the power consumption of a circuit device can be lowered without increasing in load on its control system even if the number of processing sections is increased. In the sequentially delaying power-OFF control as described above, further reduced power consumption can be achieved without impairing its normal performance nor increasing in load on its control system even if the number of processing sections is increased.

2. EXAMPLE 2.1) Circuit Structure

Figure 3:
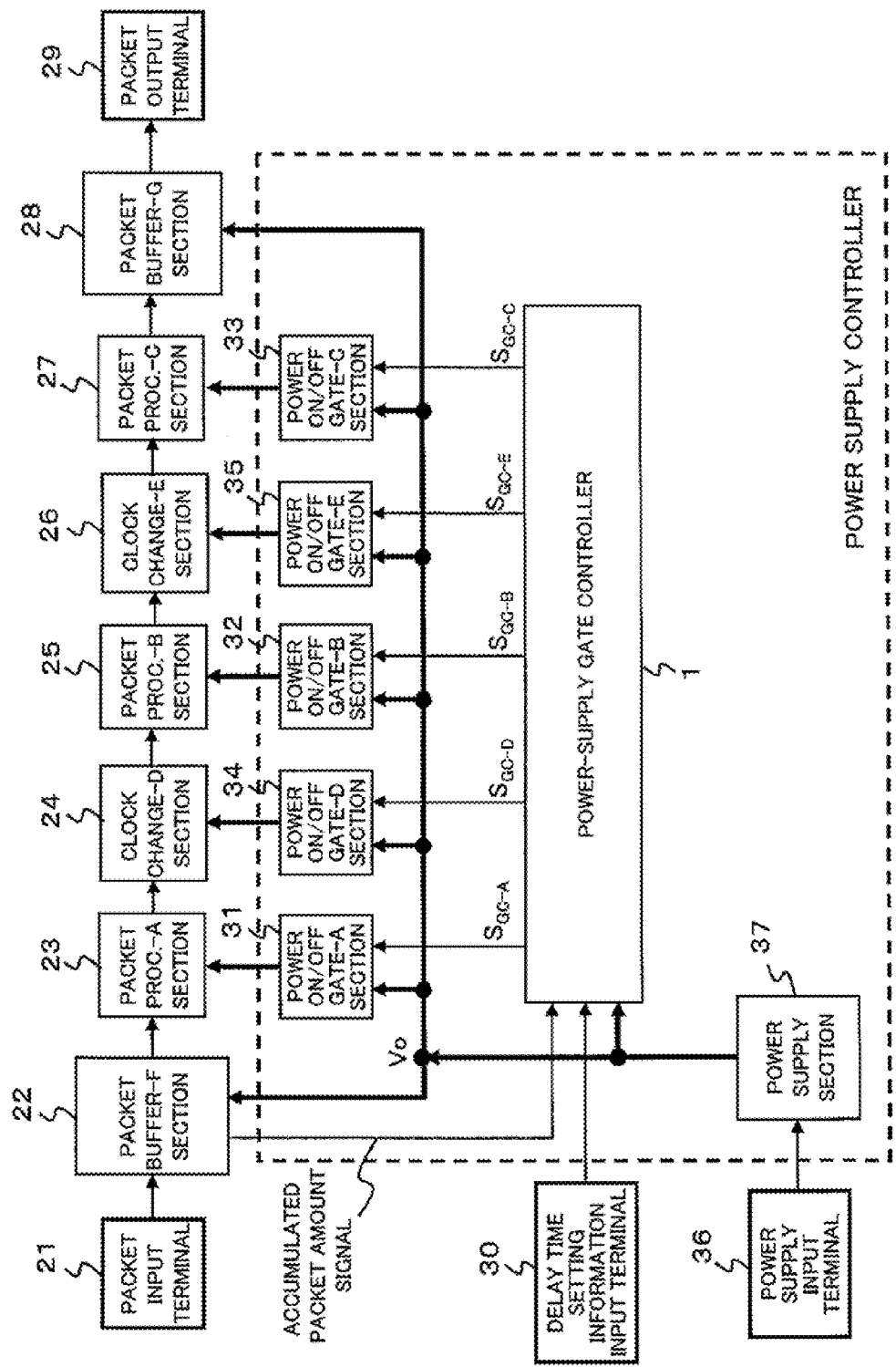
FIG. 3 is a diagram showing a packet processing circuit of packet-based communication equipment according to an example of the exemplary embodiment of the present invention.

As shown in FIG. 3, a power supply controller of packet-based communication equipment according to the present example is one embodying a packet processing function used in the packet-based communication equipment to which a varying amount of traffic is input.

The packet-based communication equipment includes a power-supply gate controller 1, a packet input terminal 21, a packet buffer-F section 22, a packet processing-A section 23, a clock change-D section 24, a packet processing-B section 25, a clock change-E section 26, a packet processing-C section 27, a packet buffer-G section 28, a packet output terminal 29, a delay time setting information input terminal 30, a power ON/OFF gate-A section 31, a power ON/OFF gate-B section 32, a power ON/OFF gate-C section 33, a power ON/OFF gate-D section 34, a power ON/OFF gate-E section 35, a power-supply-section input terminal 36, and a power supply section 37.

In this example, a power supply controller corresponding to the power supply controller 103 as shown in FIG. 1 is composed of the power-supply gate controller 1, the power ON/OFF gate-A section 31, the power ON/OFF gate-B section 32, the power ON/OFF gate-C section 33, the power ON/OFF gate-D section 34, the power ON/OFF gate-E section 35, the power-supply-section input terminal 36, and the power supply section 37. The functional structure of the power-supply gate controller 1 will be described later by referring to FIG. 4.

When a packet is input from the packet input terminal 21, the packet is stored in the packet buffer-F section 22. The packet buffer-F section 22 sends, as an accumulated packet amount signal, the amount of packets accumulated in the buffer 22 to the power-supply gate controller 1. Incidentally, the maximum amount of accumulated packets in the packet buffer-F section 22 is not smaller than the amount of packets corresponding to the time taken for a packet to transmit through the packet processing-A section 23, clock change-D section 24, packet processing-B section 25, clock change-E section 26, and packet processing-C section 27.

The packet stored in the packet buffer-F section 22 is passed to the packet processing-A section 23 that performs packet processing A. The packet is subjected to the packet processing A at the packet processing-A section 23.

The packet subjected to the packet processing A at the packet processing-A section 23 is passed, via the clock change-D section 24, to the packet processing-B section 25 that performs second packet processing B. The packet is subjected to the second packet processing B at the packet processing-B section 25.

The packet subjected to the second packet processing B at the packet processing-B section 25 is passed, via the clock change-E section 26, to the packet processing-C section 27 that performs third packet processing C. The packet is subjected to the third packet processing C at the packet processing-C section 27.

The packet subjected to the third packet processing C at the packet processing-C section 27 is passed to the packet buffer-G section 28. After stored in the packet buffer-G section 28, the packet is output from the packet output terminal 29.

The power supply section 37 generates a power supply voltage and a current-carrying capacity suitable for each of constituent blocks denoted by reference numerals 1, 22-28 and 31-35 from an input power (irrespective of whether it is AC or DC) from the power supply input terminal 36 and supplies the generated power to the packet buffer-F section 22, packet processing-A section 23, clock change-D section 24, packet processing-B section 25, clock change-E section 26, packet processing-C section 27, packet buffer-G section 28, and power-supply gate controller 1.

Here, for simplification of the description, it is assumed that the power-supply voltages output from the power supply section 37 is $V_0$, a single value. However, it is needless to say that current-carrying capacities and power-supply voltages required by the individual constituent blocks denoted by reference numerals 1, 22-28 and 31-35 can be supplied respectively. The power supply section 37 supplies power to the packet processing-A section 23, packet processing-B section 25, packet processing-C section 27, clock change-D section 24, and clock change-E section 26 through the power ON/OFF gate-A section 31, power ON/OFF gate-B section 32, power ON/OFF gate-C section 33, power ON/OFF gate-D section 34, and power ON/OFF gate-E section 35, respectively.

The power-supply gate controller 1 inputs the accumulated packet amount signal from the packet buffer-F section 22 and, depending on whether it indicates the empty state of the packet buffer-F section 22, generates gate control signals $S_{GC-A}$, $S_{GC-B}$, $S_{GC-C}$, $S_{GC-D}$ and $S_{GC-E}$, each of which controls a corresponding power ON/OFF gate section. More specifically, the gate control signals $S_{GC-A}$, $S_{GC-B}$, $S_{GC-C}$, $S_{GC-D}$ and $S_{GC-E}$ cause the power ON/OFF gate-A section 31, power ON/OFF gate-B section 32, power ON/OFF gate-C section 33, power ON/OFF gate-D section 34, and power ON/OFF gate-E section 35 to power on or off the packet processing-A section 23, packet processing-B section 25, packet processing-C section 27, clock change-D section 24, and clock change-E section 26, respectively.

2.2) Power-Supply Gate Controller

Figure 4:
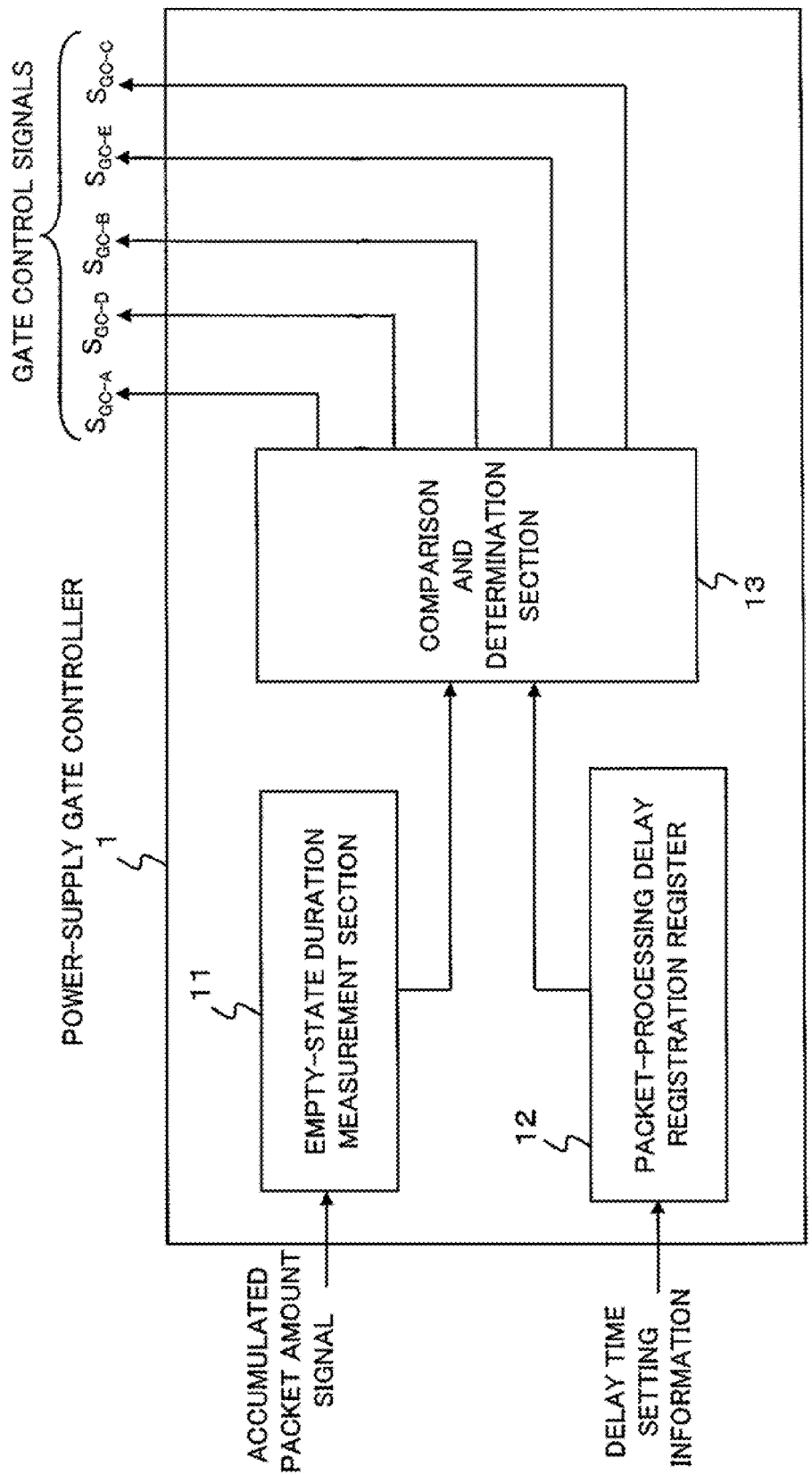
FIG. 4 is a block diagram showing an example of a power-supply gate controller as shown in FIG. 3.

Referring to FIG. 4, the power-supply gate controller 1 includes an empty-state duration measurement section 11, a packet-processing delay registration register 12, and a comparison and determination section 13. In this example, the power-supply gate controller 1 performs the concurrent power-OFF control as shown in FIG. 2A.

The empty-state duration measurement section 11 inputs the accumulated packet amount signal from the packet buffer-F section 22 and measures a lapse of time for which no input packet is stored in the packet buffer-F section to send the measured lapse of time (hereinafter, referred to as "empty-state duration") to the comparison and determination section 13.

The packet-processing delay registration register 12 inputs and registers the delay time setting information from the delay time setting information input terminal 30. In this example, the delay time setting information is the entire packet-processing delay which is a total delay of time between the time when the packet processing-A section 23 starts processing of a packet and the time when the packet processing-C section 27 completes processing of the packet received from the clock change-E section 26. The processing delay of each packet-processing section may be fixed or vary depending on the length of a packet to be processed and/or the kind of processing such as the analysis of a packet header, packet filtering and the like. As for Ethernet® frames, for example, the maximum length of a frame is 1518 bytes and the length of a jambo frame is larger than 1518 bytes. Therefore, in the case of an Ethernet® frame including an IP packet, it is necessary to set the processing delay of the frame at a packet-processing section based on the length of the IP packet. Accordingly, the delay time setting information may be registered depending on the length of a packet to be processed and/or the kind of packet processing.

The comparison and determination section 13 compares the empty-state duration and the entire packet-processing delay to determine whether to set the gate control signals $S_{GC-A}$, $S_{GC-B}$, $S_{GC-C}$, $S_{GC-D}$ and $S_{GC-E}$ for powering off the packet processing-A section 23, packet processing-B section 25, packet processing-C section 27, clock change-D section 24, and clock change-E section 26, respectively. More specifically, depending on the comparison result, the comparison and determination section 13 outputs the gate control signals $S_{GC-A}$, $S_{GC-B}$, $S_{GC-C}$, $S_{GC-D}$ and $S_{GC-E}$ to the power ON/OFF gate-A section 31, power ON/OFF gate-B section 32, power ON/OFF gate-C section 33, power ON/OFF gate-D section 34, and power ON/OFF gate-E section 5, respectively. In other words, the power-supply gate controller 1 instructs whether to supply no power (gate control signal "ON") or to supply a power (gate control signal "OFF") to each of the packet processing-A section 23, packet processing-B section 25, packet processing-C section 27, clock change-D section 24, and clock change-E section 26 individually. For example, the gate control signals $S_{GC-A}$, $S_{GC-B}$, $S_{GC-C}$, $S_{GC-D}$ and $S_{GC-E}$ are set "ON" to close their respective gates (power-OFF) from the moment the empty-state duration becomes longer than the entire packet-processing delay until the packet buffer-F section 22 is no longer in the empty state. In the other states, the gate control signals $S_{GC-A}$, $S_{GC-B}$, $S_{GC-C}$, $S_{GC-D}$ and $S_{GC-E}$ are set "OFF" to open the gates (power-ON).

In this manner, according to the present example, in packet-based communication equipment to which a varying amount of traffic is input, the power consumption of an electronic part is lowered when small traffic with an amount less than a maximum amount is input, based on the amount of input packets accumulated in the packet buffer-F section 22, while preventing impairment of its normal throughput achievable when the maximum-volume traffic is input.

Therefore, according to the present example, while the problem described earlier can be solved, a reduction can be achieved in the power consumption of an electronic part (such as ASIC or FPGA) mounted on equipment that cannot tolerate the idle state, such as information communication equipment.

It should be noted that the power-supply gate controller 1 may be implemented by a program running on a program-controlled processor such as a central processing unit (CPU).

2.3) Power Reduction Control

Hereinafter, control operation of the power-supply gate controller 1 will be described with reference to FIGS. 3 to 5.

As input, the power-supply gate controller 1 receives an accumulated packet amount signal from the packet buffer-F section 22 and, if it indicates the empty state, the empty-state duration measurement section 11 starts counting a lapse of time as an empty-state duration. The power-supply gate controller 1 also receives the entire packet-processing delay from the delay time setting information input terminal 30 to store the entire packet-processing delay as a power supply ON/OFF condition in the packet-processing delay registration register 12.

Figure 5:
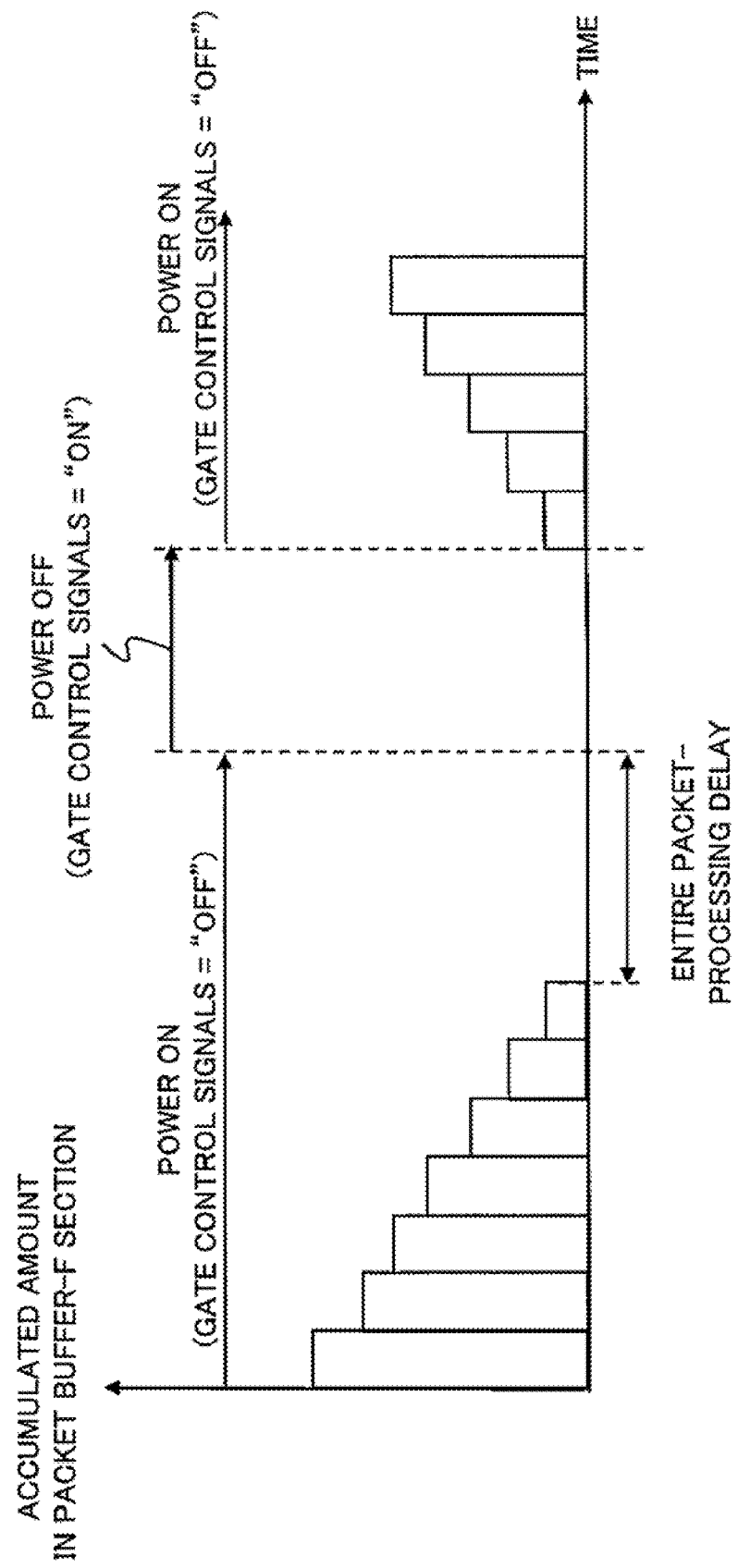
FIG. 5 is a diagram showing an example of power supply ON/OFF condition in a comparison and determination section as shown in FIG. 4.

As shown in FIG. 5, the comparison and determination section 13 compares the empty-state duration and the entire packet-processing delay to determine whether to set the gate control signals for powering off the packet processing-A section 23, packet processing-B section 25, packet processing-C section 27, clock change-D section 24, and clock change-E section 26, respectively. In other words, the power-supply gate controller 1 instructs whether to supply no power (gate control signal "ON") or to supply a power (gate control signal "OFF") to each of the packet processing-A section 23, packet processing-B section 25, packet processing-C section 27, clock change-D section 24, and clock change-E section 26 individually.

In the case where the packet buffer-F section 22 is not in the empty state, the gate control signals are set "OFF" to open their respective gates (power-ON). Further, during the empty-state duration after no packet is stored in the packet buffer-F section 22, the gate control signals are also set "OFF" to open their respective gates (power-ON).

When the empty-state duration exceeds the entire packet-processing delay, the gate control signals are changed to "ON" to close their respective gates (power-OFF) until a packet arrives and is stored in the packet buffer-F section 22.

Additionally, it is needless say that the following operations and the like are also feasible as examples of the present invention. As shown in FIG. 2B, the subtotal processing delays $D_{P1}, D_{P1-P2}, \ldots$ and $D_{P1-PN}$ are previously set in the packet-processing delay registration register 12. In this case, following the propagation of a packet through the packet processing sections, the comparison and determination section 13 gradually delays the times at which the gate control signals $S_{GC-A}, S_{GC-B}, S_{GC-C}, S_{GC-D}$ and $S_{SC-E}$ are set "NO" in this order so that the functional block which has no packet to process is powered off as soon as possible, thereby obtaining an effect of power reduction. Moreover, the comparison and determination section 13, following the propagation of a packet, gradually delays the times at which the gate control signals $S_{GC-A}, S_{GC-B}, S_{GC-C}, S_{GC-D}$ and $S_{GC-E}$ are set "OFF" in this order so that the functional block which has a packet to process is powered on as late as possible, thereby obtaining a further effect of power reduction.

2.4) Advantages

As described above, according to the present example, the supply of power to each of the packet processing sections and clock change sections is stopped after a preset packet-processing delay has elapsed from when the packet buffer-F section 22 has been in the empty state. Since the power-supply gate controller 1 monitors only the amount of accumulated packets in the packet buffer-F section 22, it is possible to reduce the operating power consumption of each packet processing section without increasing in load on the power-supply gate controller 1 even if the number of processing sections is increased. Accordingly, the present example has the effect that the average power consumption can be effectively suppressed independently of the number of processing sections.

In packet-based communication equipment to which a varying amount of traffic is input, it is possible to lower the power consumption of a circuit when small traffic with an amount less than a maximum amount is input, without impairing its normal throughput achievable when maximum-volume traffic is input. Therefore, the average power consumption of an electronic part (such as EPGA or ASIC) can be reduced more greatly than by the related techniques described earlier, without using special development tools such as asynchronous circuitry and schemes unlike the related techniques.

In the present example, which has been described hereinabove, a detailed description of the packet buffer-G section 28 in FIG. 3 will be omitted because it is well known to those ordinarily skilled in the art and is not directly related to the present invention.

Additionally, in the configuration shown in FIG. 3, three packet processing sections and two clock change sections are shown. However, this configuration is merely an example of N (N is an integer equal to or greater than one) packet processing sections and (N−1) clock change sections. It is needless to say that, in the case of a minimum configuration when N=1, only one packet processing section suffices.

The present invention may be embodied in other specific forms without departing from the spirit or essential characteristics thereof. The above-described exemplary embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A circuit comprising:
    an input buffer for storing input data;
    a plurality of processing sections connected in series including a head processing section and a tail-end processing section to sequentially process the input data; and
    a power supply controller for monitoring only whether the input buffer is in a stored state or an empty state, and for turning off power supply to each of the plurality of processing sections depending on a lapse of time during which the input buffer has been in the empty state,
    wherein in the stored state the input buffer is not completely empty, and in the empty state the input buffer is completely empty.

2. The circuit according to claim 1, wherein the power supply controller turns off the power supply to each of the plurality of processing sections when the lapse of time reaches a processing delay between the head processing section and a corresponding processing section.

3. The circuit according to claim 2, wherein the power supply controller concurrently turns off the power supply to all of the plurality of processing sections when the lapse of time reaches an entire processing delay between the head processing section and the tail-end processing section.

4. The circuit according to claim 3, wherein the power supply controller concurrently turns on the power supply to all of the plurality of processing sections when input data is stored into the input buffer in a state of powering off the plurality of processing sections.

5. The circuit according to claim 2, wherein the power supply controller sequentially turns off the power supply to the plurality of processing sections from the head to the tail-end processing section when the lapse of time reaches each of processing delays between the head processing section and respective ones of the plurality of processing sections.

6. The circuit according to claim 5, wherein the power supply controller sequentially turns on the power supply to the plurality of processing sections when a lapse of time after input data has been stored into the input buffer in a state of powering off the plurality of processing sections reaches each of processing delays between the head processing section and respective ones of the plurality of processing sections but the tail-end processing section.

7. The circuit according to claim 2, wherein the power supply controller comprises:
    a timer for measuring the lapse of time between a time when the head processing section starts processing the input data and a time when a corresponding processing section completes processing data received from a previous processing section;
    a storage section for storing a processing delay between the head processing section and a corresponding processing section; and
    a comparator for comparing the lapse of time and the processing delay to determine whether the power supply to each of the plurality of processing sections is turned on or off.

8. A communication device comprising the circuit according to claim 1.

9. A method for controlling power supply to a plurality of processing sections connected in series including a head processing section and a tail-end processing section to sequentially process input data stored in an input buffer, comprising:
    monitoring only whether the input buffer is in a stored state or an empty state;

measuring a lapse of time during which the input buffer has been in the empty state; and turning off power supply to each of the plurality of processing sections depending on the lapse of time, wherein in the stored state the input buffer is not completely empty, and in the empty state the input buffer is completely empty.

10. The method according to claim 9, wherein the power supply to each of the plurality of processing sections is turned off when the lapse of time reaches a processing delay between the head processing section and a corresponding processing section.

11. The method according to claim 10, wherein the power supply to all of the plurality of processing sections is concurrently turned off when the lapse of time reaches an entire processing delay between the head processing section and the tail-end processing section.

12. The method according to claim 11, wherein the power supply to all of the plurality of processing sections is concurrently turned on when input data is stored into the input buffer in a state of powering off the plurality of processing sections.

13. The method according to claim 10, wherein the power supply to the plurality of processing sections from the head to the tail-end processing section is sequentially turned off when the lapse of time reaches each of processing delays between the head processing section and respective ones of the plurality of processing sections.

14. The method according to claim 13, wherein the power supply to the plurality of processing sections from the head to the tail-end processing section is sequentially turned on when a lapse of time after input data has been stored into the input buffer in a state of powering off the plurality of processing sections reaches each of processing delays between the head processing section and respective ones of the plurality of processing sections but the tail-end processing section.

15. The method according to claim 10, wherein the lapse of time is a period of time between a time when the head processing section starts processing the input data and a time when a corresponding processing section completes processing data received from a previous processing section, wherein the power supply to each of the plurality of processing sections is controlled by:

storing a processing delay between the head processing section and a corresponding processing section; and comparing the lapse of time and the processing delay to determine whether the power supply to each of the plurality of processing sections is turned on or off 16. A non-transitory computer-readable data storage medium storing a computer program for instructing a program-controlled processor to control power supply to a plurality of processing sections connected in series including a head processing section and a tail-end processing section to sequentially process input data stored in an input buffer, comprising:

monitoring only whether the input buffer is in a stored state or an empty state;

measuring a lapse of time during which the input buffer has been in the empty state; and turning off power supply to each of the plurality of processing sections depending on the lapse of time, wherein in the stored state the input buffer is not completely empty, and in the empty state the input buffer is completely empty.

17. The non-transitory computer-readable data storage medium according to claim 16, wherein the power supply to each of the plurality of processing sections is turned off when the lapse of time reaches a processing delay between the head processing section and a corresponding processing section.

18. The non-transitory computer-readable data storage medium according to claim 17, wherein the power supply to all of the plurality of processing sections is concurrently turned off when the lapse of time reaches an entire processing delay between the head processing section and the tail-end processing section.

19. The non-transitory computer-readable data storage medium according to claim 18, wherein the power supply to all of the plurality of processing sections is concurrently turned on when input data is stored into the input buffer in a state of powering off the plurality of processing sections.

20. The non-transitory computer-readable data storage medium according to claim 17, wherein the power supply to the plurality of processing sections from the head to the tail-end processing section is sequentially turned off when the lapse of time reaches each of processing delays between the head processing section and respective ones of the plurality of processing sections.

21. The non-transitory computer-readable data storage medium according to claim 20, wherein the power supply to the plurality of processing sections from the head to the tail-end processing section is sequentially turned on when a lapse of time after input data has been stored into the input buffer in a state of powering off the plurality of processing sections reaches each of processing delays between the head processing section and respective ones of the plurality of processing sections but the tail-end processing section.

22. The non-transitory computer-readable data storage medium according to claim 17, wherein the lapse of time is a period of time between a time when the head processing section starts processing the input data and a time when a corresponding processing section completes processing data received from a previous processing section, wherein the power supply to each of the plurality of processing sections is controlled by:

storing a processing delay between the head processing section and a corresponding processing section; and comparing the lapse of time and the processing delay to determine whether the power supply to each of the plurality of processing sections is turned on or off 23. A communication device implementing the method according to claim 9.

24. A communication device comprising a program-controlled processor which executes the computer program according to claim 16.

* * * * *